(12) United States Patent
Suzuki

(10) Patent No.: US 8,313,078 B2
(45) Date of Patent: Nov. 20, 2012

(54) SUPPORT SYSTEM FOR POWER TRAIN OF VEHICLE

(75) Inventor: Shintaro Suzuki, Shizuoka-Ken (JP)

(73) Assignee: Suzuki Motor Corporation, Hamamatsu-shi (JP)

( * ) Notice: Subject to any disclaimer, the term of this patent is extended or adjusted under 35 U.S.C. 154(b) by 10 days.

(21) Appl. No.: 13/092,745

(22) Filed: Apr. 22, 2011

(65) Prior Publication Data

US 2011/0266412 A1  Nov. 3, 2011

(30) Foreign Application Priority Data

Apr. 28, 2010  (JP) .................. 2010-103707

(51) Int. Cl.
*F16M 11/00* (2006.01)

(52) U.S. Cl. ...................... 248/638; 248/675

(58) Field of Classification Search .......... 248/638, 248/675, 674, 200, 500, 560, 562; 180/377, 180/382, 312, 299
See application file for complete search history.

(56) References Cited

U.S. PATENT DOCUMENTS

| | | | |
|---|---|---|---|
| 6,155,372 A * | 12/2000 | Hirasaka .................. | 180/297 |
| 6,390,223 B1 * | 5/2002 | Savage et al. .................. | 180/300 |
| 2009/0321607 A1 * | 12/2009 | Baron et al. .................. | 248/562 |
| 2011/0308877 A1 * | 12/2011 | Hiruma .......................... | 180/299 |
| 2012/0160590 A1 * | 6/2012 | Wakatsuki et al. ........... | 180/291 |

FOREIGN PATENT DOCUMENTS

JP  4334625  11/1992

* cited by examiner

*Primary Examiner* — Ramon Ramirez

(74) *Attorney, Agent, or Firm* — Barnes & Thornburg LLP

(57) ABSTRACT

A vehicle power train support system composed of a plurality of support units including right and left support units. One paired support unit has a mount device mounted on the side members and includes an outer cylinder and a central shaft having an axis extending in a vertical direction of the vehicle, mount brackets secured to front and rear portions of the outer cylinder, extension brackets disposed, with a predetermined space therebetween in the longitudinal direction of the vehicle, to an upper portion of the side member, a further mount bracket secured to the power train, the another mount bracket being connected to a lower end of the central shaft protruding downward from a bottom portion of the outer cylinder, and a U-shaped stopper bracket mounted to a lower portion of the outer cylinder, the U-shaped stopper bracket surrounding front, lower and rear portions of the further mount bracket.

4 Claims, 3 Drawing Sheets

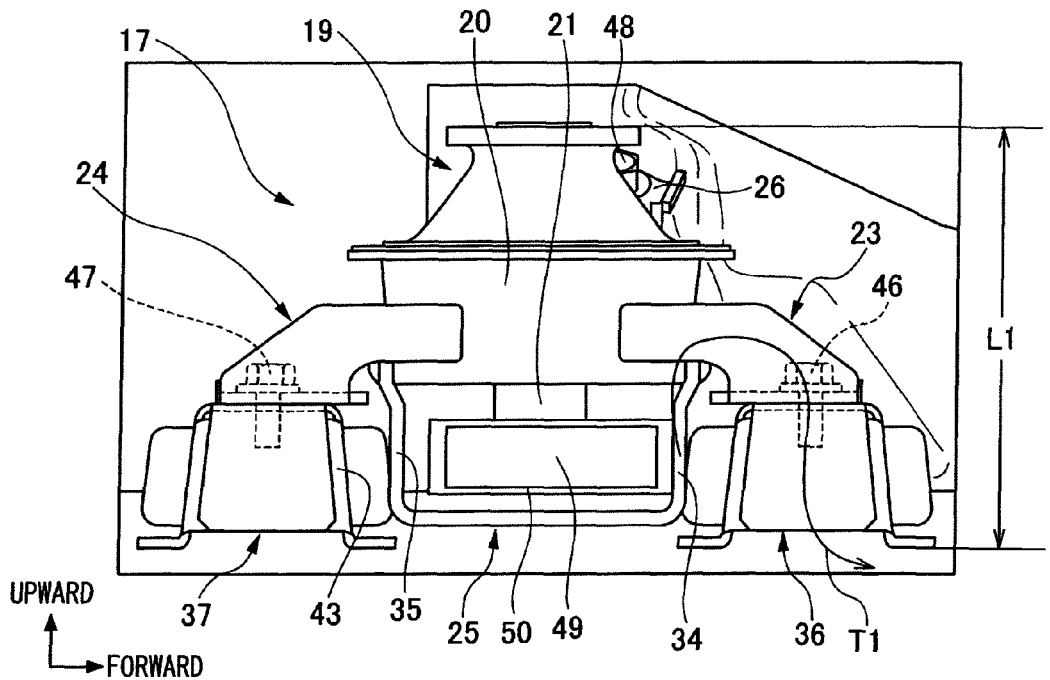
FIG. 5
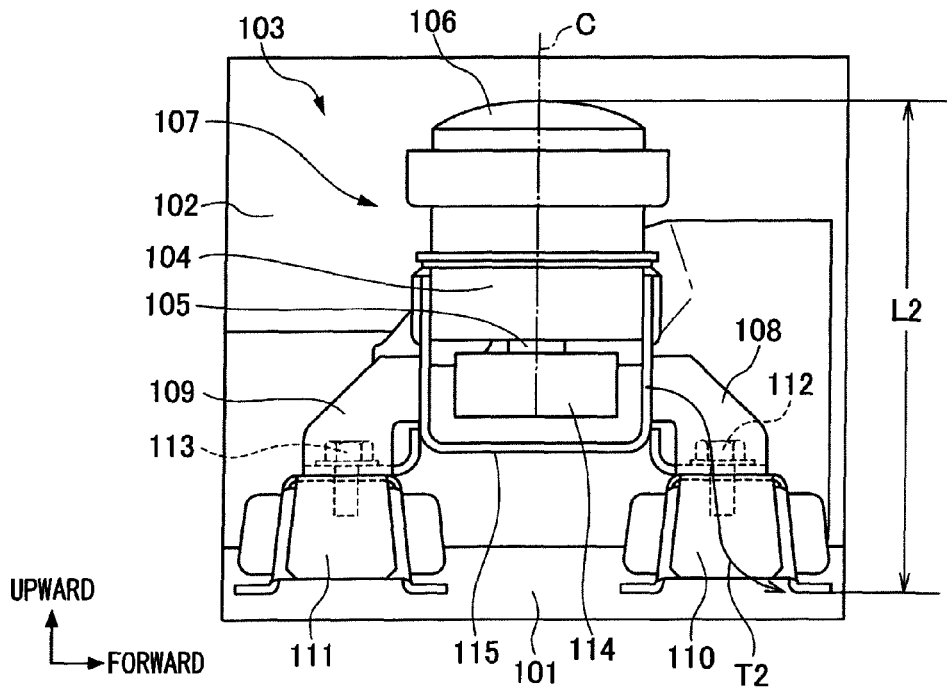
PRIOR ART  FIG. 6

SUPPORT SYSTEM FOR POWER TRAIN OF VEHICLE

PRIORITY CLAIM

This patent application claims priority to Japanese Patent Application No. 2010-103707, filed Apr. 28, 2010, the disclosure of which is incorporated herein by reference in its entirety.

BACKGROUND OF THE INVENTION

1. Field of the Invention

The present invention relates to a support system of a power train of a vehicle such as automobile particularly capable of preventing a power train from being significantly moved rearward of a vehicle (i.e., vehicle body) body by an external force applied to a front portion of the vehicle without adding new components or increasing strength of a bracket or a bolt. It is to be noted that the term "vehicle" is used herein as being substantially identical to "vehicle body".

2. Description of the Related Art

FIG. 6 shows an example of a support system of a vehicle power train that elastically supports a power train including an engine and a transmission arranged in an engine room of a vehicle such as automobile to thereby prevent vibration transmitted to a vehicle body.

In FIG. 6, reference numeral 101 denotes a left side member, reference numeral 102 denotes a left side panel, and reference numeral 103 denotes a support system. The support system 103 supports the power train disposed between a pair of left and right side members 101 (right side member is not shown) extending in a fore/aft direction (longitudinal direction or running direction) of the vehicle in an engine room. An outer cylinder 104 and a central shaft 105 both have a common axis C extending in a vertical direction of the vehicle body in a usual drivable state. A mount device 107, to which the central shaft 105 is connected to an inner periphery of the outer cylinder 104 via an isolator 106 made of rubber (rubber isolator 106), is placed on the side member 101.

In the support system 103, mount brackets 108 and 109 are secured to front and rear portions of the outer cylinder 104 of the mount device 107. The mount brackets 108 and 109 are fastened by means of bolts 112 and 113 to extension brackets 110 and 111 disposed on an upper portion of the left side member 101 with a predetermined gap therebetween in the longitudinal direction of the vehicle. The extension brackets 110 and 111 are secured to the side member 101 and the side panel 102.

In the support system 103, the central shaft 105 of the mount device 107 protrudes downward from a bottom portion of the outer cylinder 104, and a mount bracket 114 secured to the power train is connected to a lower end of the central shaft 105. In the mount device 107, a U-shaped stopper bracket 115 surrounding front, lower and rear portions of the mount bracket 114 is mounted to a lower portion of the outer cylinder 104. In the mount device 107, the mount brackets 108 and 109 are mounted to front and rear portions of the stopper bracket 115, and thus, the mount brackets 108 and 109 are mounted to the front and rear portions of the outer cylinder 104 via the stopper bracket 115.

Japanese Patent Application Laid-open Publication HEI 4-334625 (Patent Document 1) discloses one example of such a support system of a vehicle power train, which includes a structure such that, in a mount device in which a central shaft having an axis extending in a vertical direction of a vehicle is connected via a rubber isolator to an inner periphery of an outer cylinder having an axis extending in the vertical direction of the vehicle, the central shaft of the mount device protrudes downward from a bottom portion of the outer cylinder, and a mount bracket secured to a power train is connected to a lower end of the protruding central shaft.

With the structure of the vehicle in which the power train placed in the engine room in a front portion of the vehicle shown in FIG. 6 as a conventional example is supported by the support system 103, when an external force is applied to the front portion of the vehicle body, a load directed in a rear direction of the vehicle body is applied to the power train. The load is transferred to the mount device 107, the mount bracket 114, and the bolts 112 and 113 that fasten the power train and the vehicle body. When the mount device 107, the mount bracket 114, and the bolts 112 and 113 are damaged by the load, a binding force on the power train is reduced and the power train is moved toward a cabin in a rear portion of the vehicle. When the heavy power train collides with a dash panel at a predetermined speed or more, an impact force applied to an occupant is increased, thus being inconvenient and disadvantageous.

In order to reduce an amount of rearward movement of the power train of the vehicle, strength of the mount device 107, the mount bracket 114, and the bolts 112 and 113 is increased to thereby prevent them from breaking. However, when thicknesses of the mount device 107 and the mount bracket 114 are increased to ensure strength thereof, weights and cost of the mount device 107 and the mount bracket 114 are increased. Furthermore, in order to ensure strength of the bolts 112 and 113, it may be possible to increase nominal diameters or strength classifications, which however similarly increases weights and cost. Further, when strength of one component is increased, strength of the other components is relatively reduced, and accordingly, in order to increase overall strength, strength of the other components needs to be considered.

In another countermeasure, a stopper mechanism that controls a movement direction of the power train may be added to prevent the power train from being moved toward the cabin in the rear portion of the vehicle. However, it is required to newly add the stopper mechanism to reduce flexibility in layout, resulting in increasing in cost and weight.

Furthermore, in the conventional mount device 107, since a structure in which the mounting brackets 108 and 109 are directly connected to the stopper bracket 115 is adopted, when the power train significantly oscillates and the mount bracket 114 is brought into contact with the stopper bracket 115 in general use, vibration of the power train is not attenuated because of in a relatively short path but is transmitted to the extension brackets 110 and 111 on the vehicle body.

SUMMARY OF THE INVENTION

The present invention was conceived in consideration of the circumstances mentioned above and an object of the present invention is to a support system of a power train of a vehicle capable of preventing transmission of vibration to a vehicle body, and prevents a power train from being significantly moved rearward of a vehicle when an external force is applied to the vehicle.

The above and other objects can be achieved according to the preferred embodiment of the present invention by providing a support system of a vehicle power train including a plurality of support units including a pair of right and left support units supporting a power train, at both ends thereof, placed between a pair of left and right side members extending in a longitudinal direction of a vehicle, one of the paired support units of the support system comprising:

a mount device mounted on the side members, the mount device including an outer cylinder and a central shaft having an axis extending in a vertical direction of the vehicle, the central shaft being coupled with an inner periphery of the outer cylinder via a vibration isolator made of rubber;

mount brackets secured to front and rear portions of the outer cylinder;

extension brackets disposed, with a predetermined space therebetween in the longitudinal direction of the vehicle, to an upper portion of the side member, the mount brackets being fastened to the extension brackets by means of bolts;

a further mount bracket secured to the power train, the further mount bracket being connected to a lower end of the central shaft protruding downward from a bottom portion of the outer cylinder; and a U-shaped stopper bracket mounted to a lower portion of the outer cylinder, the U-shaped stopper bracket surrounding front, lower and rear portions of the further mount bracket, wherein the stopper bracket has a lower end protruding downward from an upper end of the extension bracket in the vertical direction of the vehicle, and the stopper bracket is disposed in the space between the extension brackets.

The above aspect of the embodiment of the present invention may include the following preferred examples.

It may be desired that the stopper bracket and the mount brackets are secured to the outer cylinder without contacting to each other.

The extension bracket may have a front side wall opposing to a rear side wall of the stopper bracket such that the front side wall is inclined rearward of the vehicle so that an upper end of the front side wall is located on a rear side of the vehicle from a lower end of the front side wall.

The other one of the paired support units may have substantially symmetrical arrangement with that of the above-mentioned one of the paired support structure.

According to the preferred embodiment of the present invention of the structures mentioned above, when the power train is moved rearward of the vehicle by an external force applied to the front portion of the vehicle, the stopper bracket of the mount device is brought into contact with the extension bracket to thereby prevent the power train from being significantly moved rearward of the vehicle.

At this time, in the support system, the stopper bracket mounted to the mount device can be simply lowered in position and disposed between the extension brackets to prevent the power train from being moved rearward of the vehicle. Thus, it is not necessary to additionally arrange a new component, increase a thickness of a bracket or the like, or increase a diameter of a bolt, and in addition, the vehicle can be reduced in weight.

Furthermore, according to the support system of a vehicle power train of the present embodiment, when the power train oscillates and a further mount bracket is brought into contact with the stopper bracket via the stopper rubber in general use, vibration of the power train is transmitted to the extension bracket (vehicle body) in a path from a contact point between the further mount bracket and the stopper bracket through the outer cylinder and the mount bracket, which is longer than a conventional path, thereby attenuating vibration and reducing vibration transmitted to the vehicle body as compared with a conventional power train support structure.

The nature and further characteristic features of the present invention will be made clearer from the following descriptions made with reference to the accompanying drawings.

BRIEF DESCRIPTION OF THE DRAWINGS

In the accompanying drawings:

FIG. 5 is a right side view of the support system in a state where a further mount bracket is brought into contact with a stopper bracket via a stopper rubber of the embodiment; and FIG. 6 is a left side view of a support system of a vehicle power train of a conventional example.

DESCRIPTION OF THE PREFERRED EMBODIMENT

The present invention relates to a support system of a vehicle power train, which brings a stopper bracket of a mount device into contact with an extension bracket when a power train is moved rearward of a vehicle by an external force applied to a front portion of the vehicle, thereby preventing a power train from being significantly moved rearward of the vehicle.

One preferred embodiment of the present invention of the character mentioned above will be described hereunder with reference to the accompanying drawings. It is further to be noted that terms "upper", "lower", "right", "left" and like terms are used herein in an illustrated state on the accompanying drawings or in an actually installed state of a vehicle power train support system.

[Embodiment]

Figure 1:
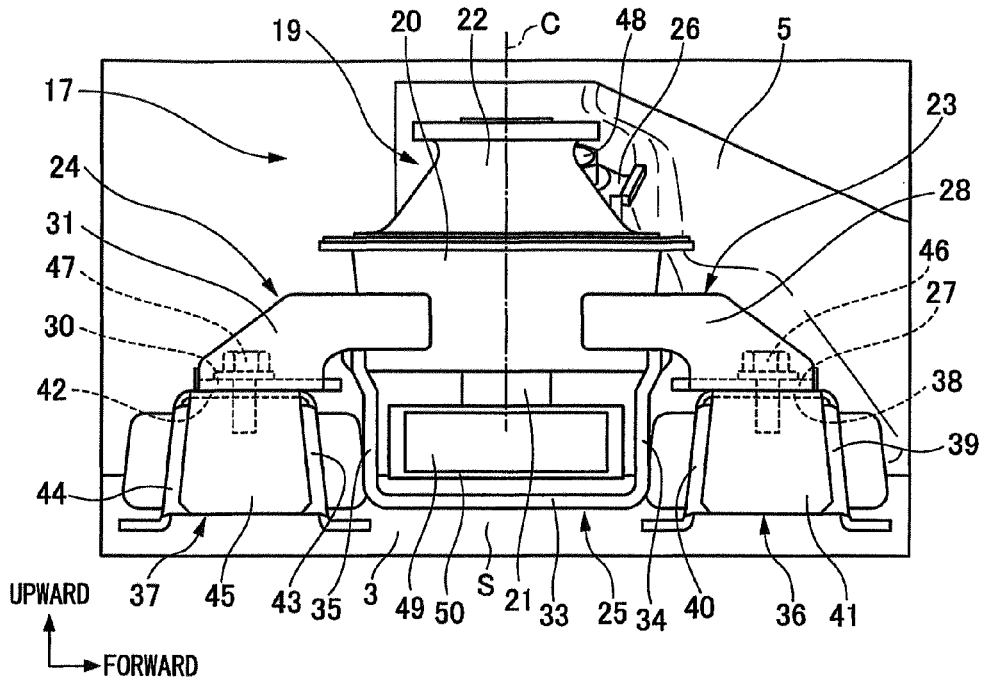
FIG. 1 is a right side view of a support system of a vehicle power train according to one embodiment of the present invention.
Figure 2:
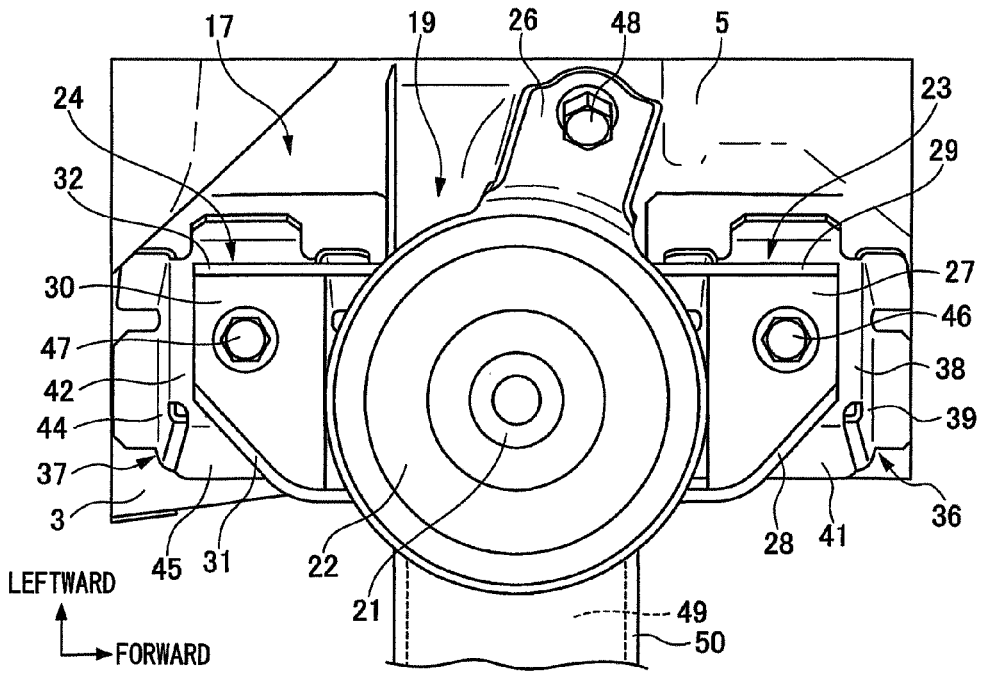
FIG. 2 is a plan view of the support system of a vehicle power train according to one embodiment of the present invention.
Figure 3:
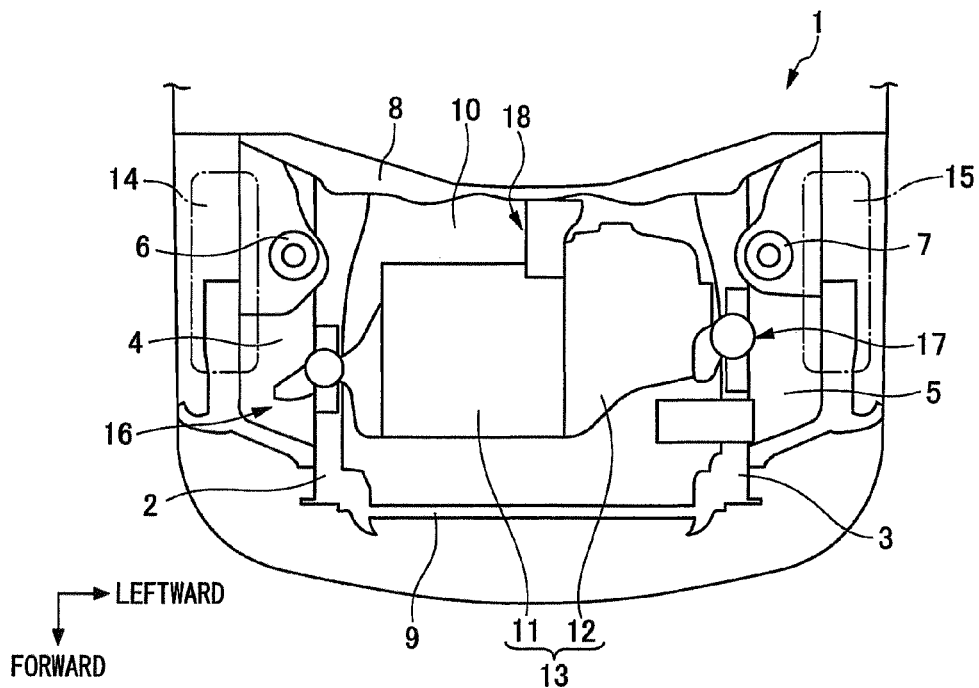
FIG. 3 is a plan view of an engine room of a vehicle of the embodiment.

With reference to FIGS. 1 to 5, particularly, FIG. 3, in an embodiment of the present invention, a vehicle 1, such as automobile, includes a power train 13 disposed between a pair of right and left side members 2 and 3 in an engine room 10. The power train 13 includes a transversely arranged engine 11 and a transmission 12 connected to a left side of the engine 11, and left and right wheels 14 and 15 are driven to steer the vehicle 1. Further, in FIG. 3, reference numerals 6 and 7 denote a pair of left and right strut towers, reference numerals 8 is a dash panel, and reference numeral 9 is a cross member.

The vehicle power train support system of the present embodiment includes right and left support units 16 and 17, and a rear support unit 18. In the illustrated structure of the power train 13, the right support unit 16 supports the engine 11 on the right side member 2, the left support unit 17 supports the transmission 12 on the left side member 3, and the rear support unit 18 supports the engine 11 on a rear lower cross member (not shown).

Since the left and right support units 16 and 17 of the power train 13 have substantially symmetrical structures, the support unit 17 that supports the transmission 12 on the left side member 3 will be described below.

As shown in FIGS. 1 and 2, in the support unit 17 of the power train 13, a mount device 19 is mounted on the left side member 3. The mount device 19 includes an outer cylinder 20 and a central shaft 21 having an axis C extending in a vertical direction of the vehicle 1, the central shaft 21 is connected to an inner periphery of the outer cylinder 20 via a vibration isolator made of rubber (rubber vibration isolator) 22, and the central shaft 21 protrudes downward from a bottom portion of the outer cylinder 20.

In the mount device 19, mount brackets 23 and 24 are secured to front and rear portions of the outer cylinder 20, a U-shaped stopper bracket 25 is secured to a lower portion of the outer cylinder 20 in a side view, and a mount bracket 26 protrudes from a left side of the outer cylinder 20.

The mount bracket 23 is formed into a substantially U-shape composed of a lower side wall 27 and right and left side walls 28 and 29 rising from left and right ends of the lower side wall 27. The right side wall 28 and the left side wall 29 extend rearward and are secured to left and right side portions of the front portion of the outer cylinder 20.

On the other hand, the mount bracket 24 is formed into a substantially U-shape composed of a lower side wall 30 and right and left side walls 31 and 32 rising from left and right ends of the lower side wall 30. The right side wall 31 and the left side wall 32 extend forward and are secured to left and right portions of the rear portion of the outer cylinder 20.

Furthermore, the stopper bracket 25 is formed into a substantially U-shape composed of a lower side wall 33 and front and rear side walls 34 and 35 rising from front and rear ends of the lower side wall 33. The front side wall 34 and the rear side wall 35 extend upward and are secured to front and rear portions of the outer cylinder 20. The mount bracket 26 protrudes in a trough shape from a left side portion of the outer cylinder 20.

In the support system 17, two extension brackets 36 and 37 are disposed with a predetermined gap therebetween in the longitudinal direction of the vehicle in an upper portion of the left side member 3.

The front side extension bracket 36 is formed into a substantially box shape with an expanding lower portion composed of an upper side wall 38 and front and rear side walls 39 and 40 extending obliquely downward from front and rear ends of the upper side wall 38, and a right side wall 41 extending obliquely downward from a right end of the upper side wall 38 and connected to the front and rear side walls 39 and 40. In the extension bracket 36, lower ends of the front side wall 39 and the rear side wall 40 extend and are secured to the side member 3, left ends of the front side wall 39 and the rear side wall 40 extend and are secured to the left side panel 5, and a left end of the upper side wall 38 extend and is secured to the side panel 5.

The extension bracket 37 in the rear portion is formed into a substantially box shape with an expanding lower portion composed of an upper side wall 42 and front and rear side walls 43 and 44 extending obliquely downward from front and rear ends of the upper side wall 42, and a right side wall 45 extending obliquely downward from a right end of the upper side wall 42 and connected to the front and rear side walls 43 and 44.

In the extension bracket 37, lower ends of the front side wall 43 and the rear side wall 44 extend and are secured to the side member 3, left ends of the front side wall 43 and the rear side wall 44 extend and are secured to the left side panel 5, and a left end of the upper side wall 42 extend and is secured to the side panel 5.

In the support unit 17, the lower side wall 27 of the mount bracket 23 of the mount device 19 and the lower side wall 30 of the mount bracket 24 are fastened by means of bolts 46 and 47 to the upper side wall 38 of the extension bracket 36 and the upper side wall 42 of the extension bracket 37. The mount bracket 26 of the mount device 19 is fastened to the side panel 5 by means of a bolt 48.

In the support unit 17, a mount bracket 49 secured to the power train 13 is connected to a lower end of the central shaft 21 protruding downward from the bottom portion of the outer cylinder 20 of the mount device 19. The mount bracket 49 is covered with a stopper rubber 50, and the U-shaped stopper bracket 25 mounted to the lower portion of the outer cylinder 20 of the mount device 19 surrounds front, lower and rear portions of the mount bracket 49.

As shown in FIG. 1, in the support unit 17 of the power train 13, the lower wall portion 33 protrudes, at a lower end of the stopper bracket 25, downward from the upper side walls 38 and 42 at the upper ends of the two extension brackets 36 and 37 in the vertical direction of the vehicle 1, and the stopper bracket 25 is disposed in the space S between the extension brackets 36 and 37.

Figure 4:
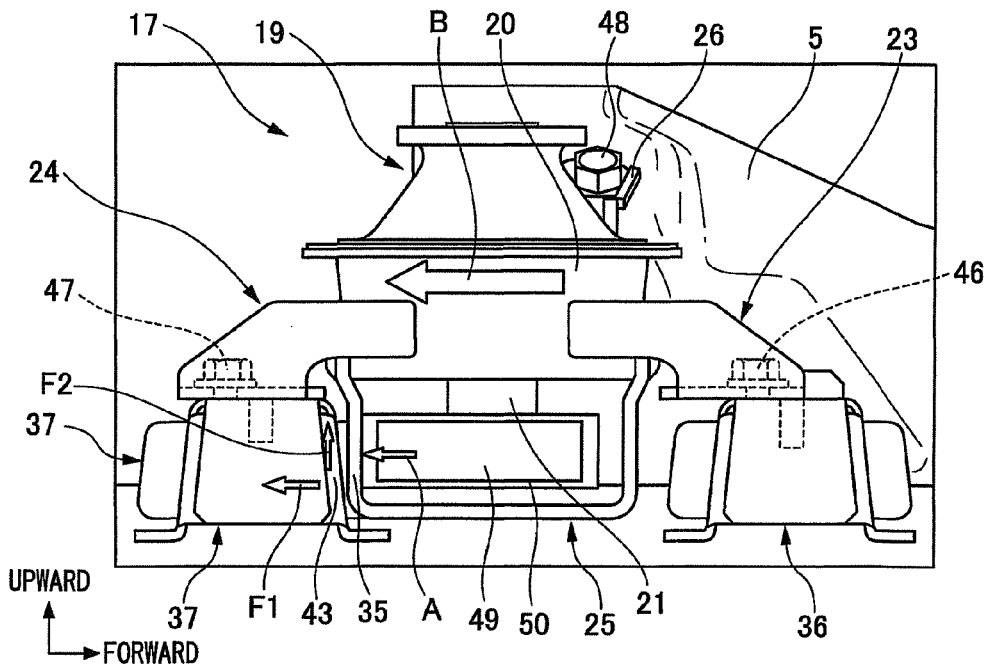
FIG. 4 is a right side view of the support system in a state where a mount device is moved rearward of the vehicle by an external force according to the embodiment.

Thus, in the support unit 17 of the power train 13, when the power train 13 is moved rearward of the vehicle by an external force applied to the front side portion of the vehicle body 1, as shown in FIG. 4, the mount bracket 49 moved rearward of the vehicle (arrow A) abuts against the rear side wall 35 in the stopper bracket 25 of the mount device 19 via the stopper rubber 50. Even if the mount device 19 is moved rearward of the vehicle (arrow B) to break the bolts 46 and 47, the rear side wall 35 of the stopper bracket 25 is brought into contact with the front side wall 43 of the extension bracket 37 in the rear portion, thereby preventing the power train 13 from being significantly moved rearward of the vehicle.

At this time, in the support unit 17, the stopper bracket 25 mounted to the mount device 19 can be simply lowered in position and placed between the two extension brackets 36 and 37 to thereby prevent the power train 13 from being moved rearward of the vehicle. Accordingly, it is not necessary to additionally provide a new component and to increase a thickness of a bracket or the like or increase a diameter of a bolt, thus the weight of vehicle being significantly reduced.

As shown in FIG. 5, in the support unit 17, in a general use, when the power train 13 oscillates and the mount bracket 49 is brought into contact with the front side wall 34 in the stopper bracket 25 via the stopper rubber 50, vibration of the power train 13 is transmitted to the extension bracket 36 (vehicle body) via a long path from a contact point between the mount bracket 49 and the stopper bracket 25 through the outer cylinder 20 and the mount bracket 23 in the front portion. This path is longer than a path in a conventional structure. That is, a vibration transmission path T1 becomes longer than a conventional vibration transmission path T2 shown in FIG. 6, thereby significantly attenuating and reducing vibration transmitted to the vehicle body.

As shown in FIG. 1, in the support unit 17, the stopper bracket 25 and the mount brackets 23 and 24 of the mount device 19 are secured to the outer cylinder 20 without contacting to each other.

Thus, in the support unit 17, in a general use, when the power train 13 oscillates and the mount bracket 49 is brought into contact with the stopper bracket 25 via the stopper rubber 50, vibration can be prevented from being directly transmitted from the stopper bracket 25 to the mount bracket 23 or the mount bracket 24, and vibration transmitted to the vehicle body can be reduced.

In the support unit 17, the front side wall 43 of the extension bracket 37 in the rear portion opposing to the rear side wall 35 of the stopper bracket 25 is inclined rearward of the vehicle body so that an upper end thereof is located rearward of the vehicle body from a lower end thereof as shown in FIG. 1.

As shown in FIG. 4, in the support unit 17, the mount device 19 is moved rearward of the vehicle (arrow B) by an external force applied to the front portion of the vehicle 1. When the rear side wall 35 of the stopper bracket 25 collides with the front side wall 43 of the extension bracket 37, a load F1, in a direction rearward of the vehicle, applied from the stopper bracket 25 to the extension bracket 37 can be dispersed to a load F2 in an upward direction of the vehicle by the inclination of the front side wall 43.

Thus, the support unit 17 can prevent the breaking or damage of the bolts 46 and 47 that fasten and secure the mount brackets 23 and 24 to the extension brackets 36 and 37, thereby reliably preventing the power train 13 from being moved rearward of the vehicle.

Furthermore, in the support unit 17, the two front and rear extension brackets 36 and 37 can be shared, and the mount device and the extension bracket of the right support system 16 can be also shared with those of the left support system 17. According to such sharing use, the number of components and cost would be preferably reduced.

According to the support unit 17, the stopper bracket 25 is held between the two extension brackets 36 and 37. Thus, a dimension L1 of the power train support system in the vertical direction (L1: distance between an upper portion of the left side member 3 and a top portion of the mount device 19 shown in FIG. 5) can be made smaller than a dimension L2 in a vertical direction of a conventional support system 103 (L2: distance between an upper portion of the left side member 101 and a top portion of the mount device 107 shown in FIG. 6), that is, (L1<L2), thereby increasing mountability of the support unit 17 in the engine room 10 with a limited space.

Furthermore, as mentioned hereinbefore, the support system of the present embodiment includes the one side support unit 17, the other side support unit 16 and the rear side support unit 18, and the other side support unit substantially symmetrical (identical) structure, and accordingly, totally, the vehicle power train support system of the present embodiment can be mounded in the engine room with a reduced space, thus being convenient and advantageous.

As mentioned hereinbefore, according to the preferred embodiment of the present invention, the vibration can be prevented from being transmitted to the vehicle body, and prevent the power train from being significantly moved rearward of the vehicle when an external force is applied to the vehicle, and can be applied to a vehicle other than an automobile including a power unit such as an engine.

It is further to be noted that the present invention is not limited to the described embodiment and many other changes and modifications may be made without departing from the scopes of the appended claims.

What is claimed is:

1. A support system of a vehicle power train including a plurality of support units including a pair of right and left support units supporting a power train, at both ends thereof, placed between a pair of left and right side members extending in a longitudinal direction of a vehicle, one of the paired support units of the support system comprising:
    a mount device mounted on the side members, the mount device including an outer cylinder and a central shaft having an axis extending in a vertical direction of the vehicle, the central shaft being coupled with an inner periphery of the outer cylinder via a vibration isolator made of rubber;
    mount brackets secured to front and rear portions of the outer cylinder;
    extension brackets disposed, with a predetermined space therebetween in the longitudinal direction of the vehicle, to an upper portion of the side member, the mount brackets being fastened to the extension brackets by means of bolts;
    a further mount bracket secured to the power train, the further mount bracket being connected to a lower end of the central shaft protruding downward from a bottom portion of the outer cylinder; and
    a U-shaped stopper bracket mounted to a lower portion of the outer cylinder, the U-shaped stopper bracket surrounding front, lower and rear portions of the further mount bracket,
    wherein the stopper bracket has a lower end protruding downward from an upper end of the extension bracket in the vertical direction of the vehicle, and the stopper bracket is disposed in the space between the extension brackets.

2. The support system of a vehicle power train according to claim 1, wherein the stopper bracket and the mount brackets are secured to the outer cylinder without contacting to each other.

3. The support system of a vehicle power train according to claim 1, wherein the extension bracket has a front side wall opposing to a rear side wall of the stopper bracket such that the front side wall is inclined rearward of the vehicle so that an upper end of the front side wall is located on a rear side of the vehicle from a lower end of the front side wall.

4. The support system of a vehicle power train according to claim 1, wherein another one of the paired support units has substantially symmetrical arrangement with that of the above-mentioned one of the paired support structure.

* * * * *